(12) United States Patent
Chen et al.

(10) Patent No.: US 8,879,667 B2
(45) Date of Patent: Nov. 4, 2014

(54) LAYER SHIFTING IN OPEN LOOP MULTIPLE-INPUT, MULTIPLE-OUTPUT COMMUNICATIONS

(75) Inventors: Xiaogang Chen, Beijing (CN); Yuan Zhu, Beijing (CN); Jong-Kae Fwu, Sunnyvale, CA (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/503,837

(22) PCT Filed: Nov. 30, 2011

(86) PCT No.: PCT/US2011/062741
§ 371 (c)(1),
(2), (4) Date: Apr. 24, 2012

(87) PCT Pub. No.: WO2013/006193
PCT Pub. Date: Jan. 10, 2013

(65) Prior Publication Data
US 2014/0146752 A1    May 29, 2014

Related U.S. Application Data

(60) Provisional application No. 61/504,054, filed on Jul. 1, 2011.

(51) Int. Cl.
*H04L 27/36*    (2006.01)
*H04W 52/24*    (2009.01)
(Continued)

(52) U.S. Cl.
CPC .............. *H04L 27/34* (2013.01); *H04W 52/244* (2013.01); *H04W 24/00* (2013.01); *H04W 72/042* (2013.01); *H04L 27/362* (2013.01); *H04L 1/0045* (2013.01); *H04W 72/04* (2013.01); *H04W 52/0212* (2013.01); *H04B 15/00* (2013.01); *H04W 52/0209* (2013.01); *H04B 7/0697* (2013.01); *H04W 52/0258* (2013.01); *H04L 1/0041* (2013.01); *H04L 5/0037* (2013.01); *H04L 1/0025* (2013.01); *H04L 1/06* (2013.01); *H04W 8/02* (2013.01)
USPC ........................... 375/298; 375/261; 375/305

(58) Field of Classification Search
CPC . H04L 27/2601; H04L 27/34; H04L 27/2697; H04L 2025/03426; H04L 27/18; H04L 25/4902; H04L 27/4921; H04L 27/1525; H04L 27/206; H04L 27/2082; H04L 27/2273; H04L 27/362; H04L 27/491
USPC .......... 375/261, 298, 308, 320, 300; 370/329, 370/335, 352, 392
See application file for complete search history.

(56) References Cited

U.S. PATENT DOCUMENTS 6,611,567 B1 *    8/2003    Balakrishnan et al. ........ 375/298
8,275,078 B2 *    9/2012    Sun et al. ...................... 375/343

(Continued)

FOREIGN PATENT DOCUMENTS

EP    0857400 A1    8/1998
EP    2317657 A2    4/2011
KR    20030039316 A    5/2003

OTHER PUBLICATIONS
U.S. Appl. No. 61/321,086 Ko et al., filed Apr. 5, 2010.*

(Continued)

*Primary Examiner* — Robert Wilson
*Assistant Examiner* — Sai Aung
(74) *Attorney, Agent, or Firm* — Schwabe, Williamson & Wyatt, P.C.

(57) ABSTRACT

Embodiments of the present disclosure describe methods, apparatuses, and systems related to use of interphase/quadrature component layer shifting in open loop multiple-input, multiple-output communications. Other embodiments may be described and/or claimed.

20 Claims, 5 Drawing Sheets

(51) Int. Cl.
*H04W 24/00* (2009.01)
*H04L 27/34* (2006.01)
*H04W 72/04* (2009.01)
*H04L 1/00* (2006.01)
*H04W 52/02* (2009.01)
*H04B 15/00* (2006.01)
*H04B 7/06* (2006.01)
*H04L 5/00* (2006.01)
*H04L 1/06* (2006.01)
*H04W 8/02* (2009.01)

(56) References Cited

U.S. PATENT DOCUMENTS

2001/0028687 A1* 10/2001 Kaneko et al. ............... 375/296
2005/0055546 A1   3/2005 Dzung
2008/0043871 A1*  2/2008 Latouche et al. ............ 375/261
2009/0074111 A1*  3/2009 Pietraski ...................... 375/340
2009/0323858 A1* 12/2009 Seller .......................... 375/298
2010/0061473 A1*  3/2010 Choi et al. ................... 375/260
2010/0310009 A1* 12/2010 Lakkis ......................... 375/308

OTHER PUBLICATIONS

International Search Report mailed Mar. 15, 2012 from International Application No. PCT/US2011/062741.

"Codeword Shifting for Clustered DFT-S-OFDM and N x DFT-S-OFDM for LTE-Advanced Uplink SU-MIMO," Alcatel-Lucent Shanghai Bell, Alcatel-Lucent, Agenda Item: 7.6.3, 3GPP TSG RAN WG1 Meeting #58bis, R1-093786, Miyazaki, Japan, Oct. 12-16, 2009, 5 pages.

"Layer Shifting in the Uplink," Agenda Item: 7.6.3, 3GPP TSG RAN WG1 Meeting #58bis, R1-094282, Miyazaki, Japan, Oct. 12-16, 2009, 8 pages.

Tomasoni et al., "Low Complexity, Quasi-Optimal MIMO Detectors for Iterative Receivers," IEEE Transactions on Wireless Communications, vol. 9, No. 10, Oct. 2010, pp. 3166-3177.

LTE Evolved Universal Terrestrial Radio Access (E-UTRA); Multiplexing and channel coding; 3GPP TS 36.212, version 10.1.0 Release 10, Mar. 30, 2011, 78 pages.

* cited by examiner

LAYER SHIFTING IN OPEN LOOP MULTIPLE-INPUT, MULTIPLE-OUTPUT COMMUNICATIONS

CROSS REFERENCE TO RELATED APPLICATIONS

The present application is a national phase entry under 35 U.S.C. §371 of International Application No. PCT/US2011/62741, filed Nov. 30, 2011, entitled "Layer Shifting In Open Loop Multiple-Input, Multiple-Output Communications", which designates the United States of America, and which claims priority to U.S. Provisional Patent Application No. 61/504,054, filed Jul. 1, 2011, the entire contents and disclosures of which are hereby incorporated by reference in their entireties.

FIELD

Embodiments of the present disclosure generally relate to the field of wireless communication systems, and more particularly, to the use of layer shifting in open loop multiple-input, multiple-output communications.

BACKGROUND

In the $3^{rd}$ Generation Partnership Project's (3GPP's) release 10 of the Long-Term Evolution-Advanced (LTE-A) standard (hereinafter "LTE-A Rel. 10"), downlink spatial multiplexing transmissions may be multiple-input, multiple-output (MIMO) communications done in either a closed-loop operation mode, for low mobility scenarios, or an open-loop operation mode, for high mobility scenarios.

In LTE-A Rel. 10, a user equipment (UE) may be configured with up to four antennas with support for up to four layers of spatial multiplexing in single-user (SU) MIMO uplink communications. However, uplink spatial multiplexing MIMO communications may only be done in the closed-loop operation mode.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
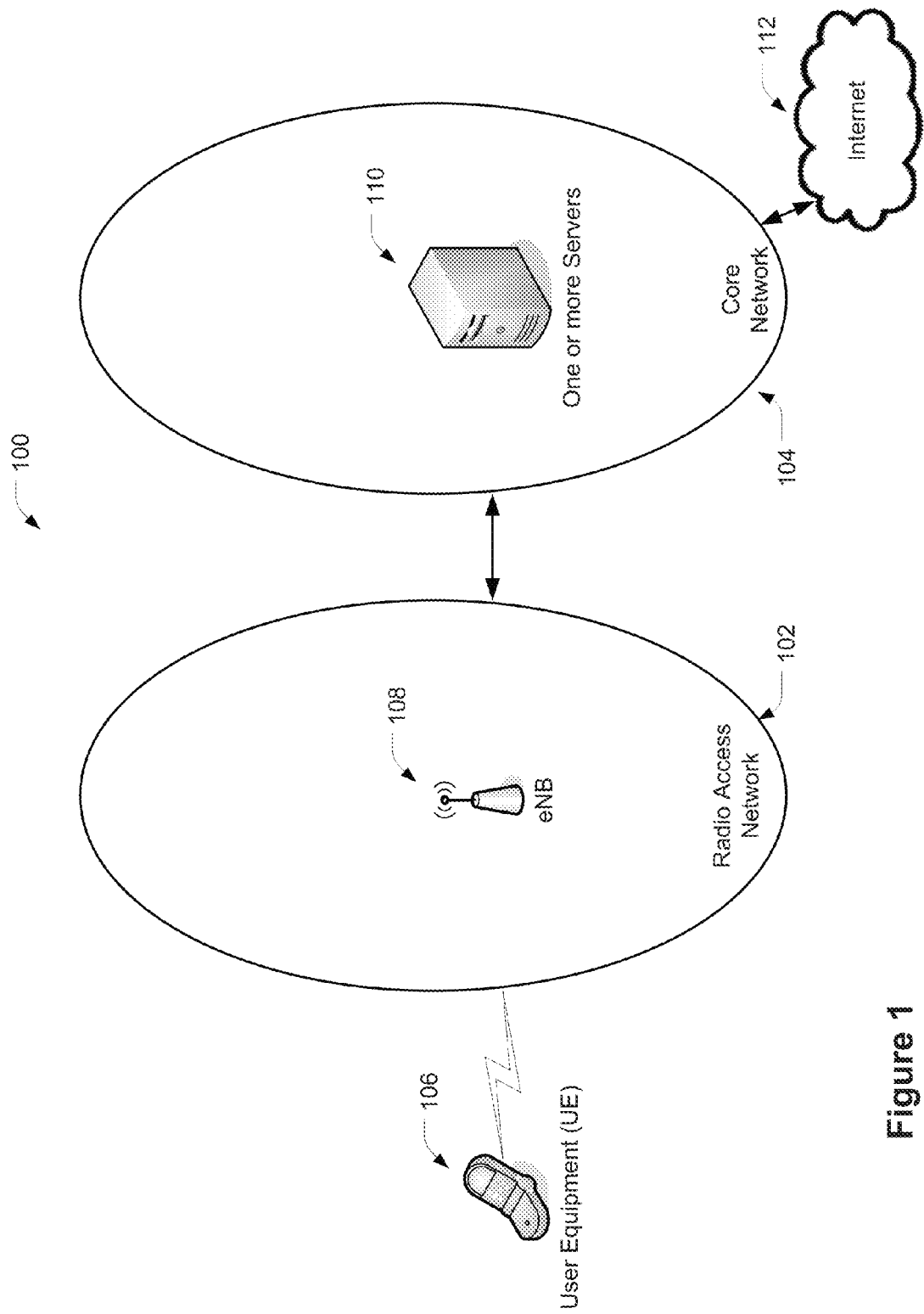
FIG. 1 illustrates a broadband wireless access network in accordance with some embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "component" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In some embodiments, a transmitter is described that includes a layer mapper configured to map a first set of quadrature amplitude modulated (QAM) symbols to a first transmission layer and a second set of QAM symbols to a second transmission layer, wherein individual QAM symbols of the first and second sets include a real component and an imaginary component; and a layer shifter configured to substitute a real or imaginary component of a first QAM symbol of the first set of QAM symbols for a corresponding real or imaginary component of a second QAM symbol of the second set of QAM symbols. The layer shifter may be configured to interchange the real or imaginary component of the first QAM symbol with the corresponding real or imaginary component of the second QAM symbol. In some embodiments, the layer shifter may be configured to interchange real or imaginary components of each QAM symbol of the first set of QAM symbols with respective real or imaginary components of each QAM symbol of the second set of QAM symbols.

In some embodiments, the layer shifter may be configured to shift one or more QAM symbols of the first set from the first transmission layer to the second transmission layer; and shift one or more QAM symbols of the second set from the second transmission layer to the first transmission layer. The one or more QAM symbols of the first set may consist of QAM symbols with odd-numbered indices, while the one or more QAM symbols of the second set may consist of QAM symbols with odd-numbered indices.

In various embodiments, the transmitter may be configured to construct a plurality of radio frequency signals to transmit the first and second set of QAM symbols by a spatially multiplexed (SM) multiple-input, multiple-output (MIMO) uplink communication. The transmitter may be configured to operate in an open loop mode to transmit the first and second set of QAM symbols by the SM MIMO uplink communication. In some embodiments, the transmitter may include one or more encoders configured to encode data for two transport blocks based on a single modulation coding scheme (MCS) value fed back from an entity to which the plurality of RF signals are directed; and/or one or more modulators configured to modulate the encoded data for two transport blocks based on the single MCS value.

In some embodiments, a method of transmitting information over a wireless network is disclosed. The method may include receiving, by a user equipment from an enhanced node base station (eNB), a downlink control information (DCI) element that includes a modulation and coding scheme (MCS) value; generating quadrature amplitude modulation (QAM) symbols on a plurality of transmission layers based on the MCS value; shifting interphase or quadrature components of the QAM symbols across the plurality of transmission layers; constructing a plurality of radio frequency signals based on the QAM symbols; and transmitting the plurality of RF signals to the eNB over a wireless interface. The shifting of interphase or quadrature components may include substituting an interphase or quadrature component from a first QAM symbol of a first transmission layer for a corresponding interphase or quadrature component from a second QAM symbol of a second transmission layer; and/or interchanging the interphase or quadrature component from the first QAM symbol with the corresponding interphase or quadrature component from the second QAM symbol.

In various embodiments, the method may further include shifting the one or more QAM symbols across the plurality of transmission layers. The shifting of the one or more QAM symbols across the plurality of transmission layers may occur after said shifting interphase or quadrature components of the QAM symbols.

In some embodiments, an enhanced node base station (eNB) is disclosed. The eNB may include a transmitter configured to transmit a downlink control information (DCI) element to a user equipment (UE), the DCI element having a modulation and coding scheme (MCS) value; and a receiver configured to: receive, as a multiple-input, multiple-output (MIMO) communication, a plurality of radio frequency (RF) signals from the UE; deconstruct the plurality of RF signals to recover a first stream of symbols on first transmission layer and a second stream of symbols on a second transmission layer; and substitute an interphase or quadrature component of a first symbol of the first stream for a corresponding interphase or quadrature component of a second symbol of the second stream. The receiver may interchange the interphase or quadrature component of the first symbol with the corresponding interphase or quadrature component of the second symbol. In some embodiments, the MCS value may be used for two transport blocks.

In some embodiments, a communication system is disclosed. The communication system may include a receiver configured to receive a modulation and coding scheme (MCS) value; and a transmitter coupled with the receiver and configured to: encode data according to the MCS value to provide encoded data; modulate the encoded data to provide quadrature amplitude multiplexing (QAM) symbols; map the QAM symbols to first and second transmission layers; and substitute an interphase or quadrature component of a QAM symbol of the first transmission layer for a corresponding interphase or quadrature component of a QAM symbol of the second transmission layer. In various embodiments, the transmitter may be configured to encode data for two transport blocks according to the MCS value.

In some embodiments, the system may further include a plurality of antennas to provide the system with a multiple-input, multiple-output communication interface. The system may be a mobile computing device that includes a user interface including a display and a microphone.

Other embodiments of the present disclosure may include other devices, apparatuses, systems, and/or methods.

FIG. 1 illustrates an example broadband wireless access (BWA) network 100 in accordance with some embodiments. The BWA network 100 may include a radio access network (RAN) 102 and a core network 104. The RAN 102 and/or core network 104 may be Internet protocol (IP) based networks.

User equipment (UE) 106 may access the core network 104 via a radio link ("link") with a base station (BS) such as, for example, an enhanced node base station (eNB) 108 in the RAN 102. The core network 104 may have one or more servers 110 to communicatively couple the RAN 102 with a wider network, e.g., the Internet 112.

The BWA network 100 is shown with certain components to facilitate discussion on the inventive concepts of the present disclosure. However, it will be understood that the BWA network 100 may include a large number of other components such as, but not limited to, gateways, servers, agents, modules, etc.

Components of the BWA network 100 may operate in conformance with the $3^{rd}$ Generation Partnership Project (3GPP) long-term evolution (LTE) project along with any amendments, updates, and/or revisions (e.g., LTE-Advanced (LTE-A), ultra mobile broadband (UMB) project (also referred to as "3GPP2"), etc.). The BWA network 100 may be referred to as an Evolved Universal Mobile Telecommunications Systems (UMTS) Terrestrial Radio Access Network (e-UTRAN) when configured to operate in conformance with 3GPP LTE. In other embodiments, components described herein may be compatible with additional/alternative communication standards, specifications, and/or protocols.

While FIG. 1 generally depicts the UE 106 as a phone, in various embodiments the UE 106 may be a personal computer (PC), a notebook, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like.

The UE 106 and/or the eNB 108 may include multiple antennas to enable multiple-input, multiple-output (MIMO) communications with one another. In some embodiments, the UE 106 and eNB 108 may communicate using spatial multiplexing (SM) to transmit/receive independent and separately encoded data signals, e.g., transmission streams, using each of multiple transmit antennas.

The UE 106 and eNB 108 may be capable of utilizing spatial multiplexing in either a closed-loop operation mode or an open-loop operation mode. In the closed-loop operation mode, a receiving entity may feed back a precoding matrix indicator (PMI) to a transmitting entity so that the transmitting entity may adjust parameters of a precoding matrix in a way such that the resulting modulation of the transmission streams increase the odds that the data will be transmitted correctly and in a timely manner.

In an open-loop operation mode, a PMI may not be fed back to the transmitting entity. This may be due to a scenario in which the UE 106 is moving too rapidly to calculate a desired PMI for a subsequent transmission.

When using SM MIMO communications in an open loop operation mode, it may be desirable to use in-phase (I) and/or quadrature (Q) layer shifting, as described herein, to compensate for the lack of the fed-back PMI. I/Q layer shifting may provide a level of transmit diversity and increase robustness of the uplink communications and the overall throughput performance may be improved, especially in the presence of antenna gain imbalance (AGI).

Figure 2:
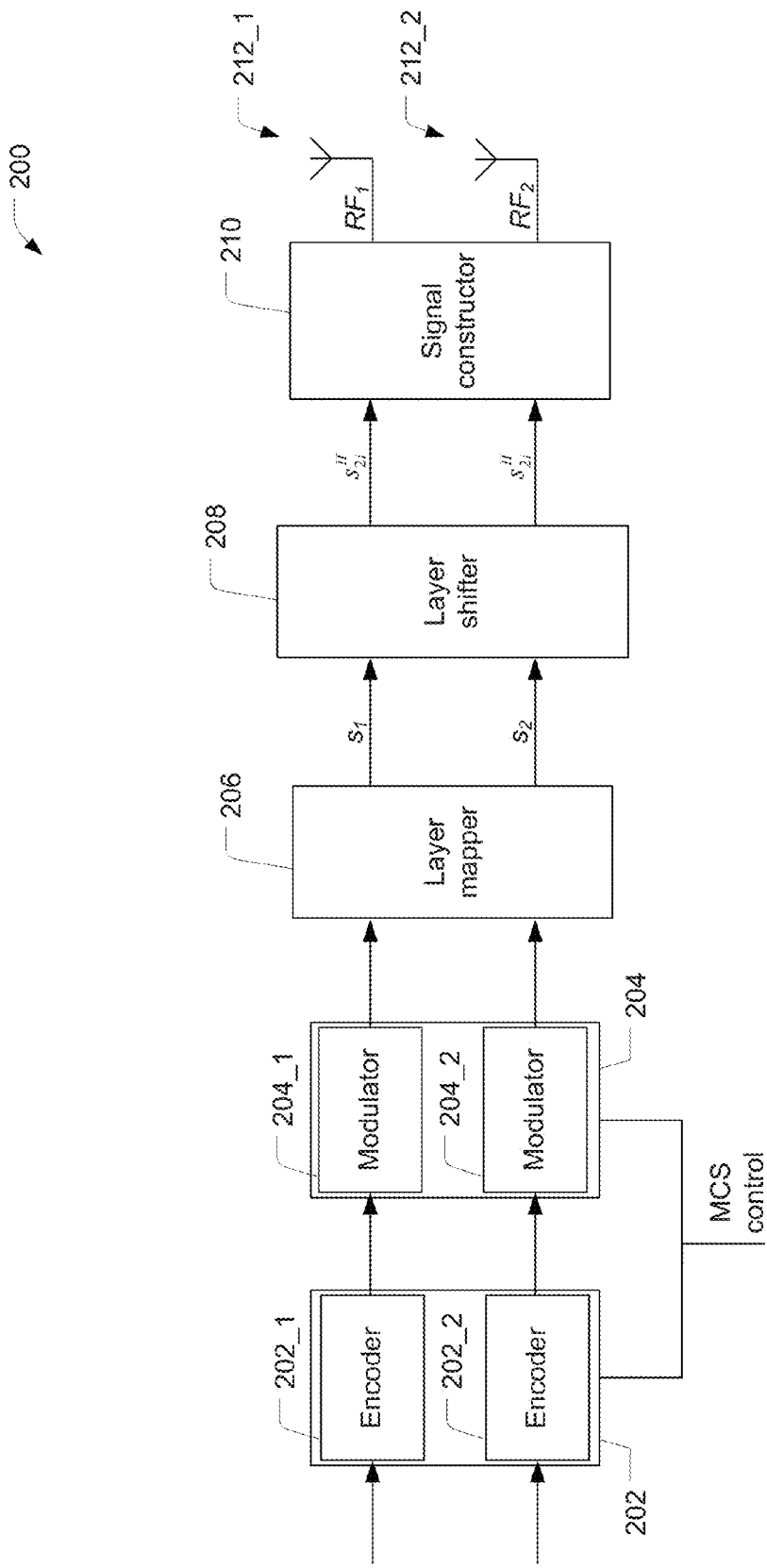
FIG. 2 illustrates a transmitter in accordance with some embodiments.

FIG. 2 illustrates a transmitter 200 in accordance with some embodiments. The transmitter 200 may be part of the UE 106 and configured to provide I/Q layer shifting to facilitate use of SM MIMO uplink communications in an open-loop operation mode, or it may part of the eNB 108 and configured to provide I/Q layer shifting to facilitate use of SM MIMO downlink communications in the open-loop operation mode.

The transmitter 200 may include encoders 202_1 and 202_2 that receive unencoded bits and encode the bits according to a coding scheme and/or rate directed by a modulation and coding scheme (MCS) control signal. The MCS control signal may be based on an MCS fed back from a receiving entity, or may be locally generated by a controller resident on the same device as the transmitter 200. In some embodiments, the encoders 202 may be turbo encoders.

The transmitter 200 may further include modulation mappers 204_1 and 204_2 coupled with the encoders 202 to receive the parallel streams of encoded bits. The modulation mappers 204 may map the parallel streams to complex symbol streams using a modulation constellation such as a quadrature amplitude modulation (QAM) constellation. The particular modulation constellation may be selected based on the MCS control signal. Each of the modulated symbols, which may be referred to as QAM symbols, may include both an in-phase component, which may also be referred to as a real component, and a quadrature component, which may also be referred to as an imaginary component.

The transmitter 200 may have a layer mapper 206 that receives the parallel complex symbol streams from the modulation mappers 204. The layer mapper 206 may then map the QAM symbols to first and second transmission layers. The QAM symbols of the first transmission layer are noted in the figures as $s_1$ while the QAM symbols of the second transmission layer are noted in the figures as $s_2$. While the described embodiments discuss the transmitter having two transmission layers other embodiments may have other numbers of transmission layers, e.g., four transmission layers.

The transmitter 200 may further include a layer shifter 208, coupled with the layer mapper 206, to receive the QAM symbols along their respective transmission layers. The layer shifter 208 may perform an I/Q layer shift to increase transmission efficiencies in uplink/downlink. An I/Q layer shift may include a shift of in-phase/quadrature components across different transmission layers. For example, the layer shifter 208 may substitute an in-phase or quadrature component of a first QAM symbol of the first transmission layer $s_1$ with a corresponding in-phase or quadrature component of a first QAM symbol of the second transmission layer $s_2$. In some embodiments, the layer shifter 208 may interchange an in-phase or quadrature component of the first QAM symbol with a corresponding in-phase or quadrature component of the second QAM symbol.

The symbols for first and second transmission layers may be $s_{1i}$ and $s_{2i}$, respectively, with $i=0, 1, \ldots, N_{sym}^{layer}$, where $N_{sym}^{layer}$ is the number of symbols per transmission layer. In some embodiments, the layer shifter 208 may interchange quadrature components of the first and second transmission layers so that the I/Q shifted transmission layers, $s_{1i}^1$ and $s_{2i}^1$ are provided by the following equation:

$$\begin{cases} s_{1i}^I = \text{real}(s_{1i}) + \text{imag}(s_{2i}) \\ s_{2i}^I = \text{real}(s_{2i}) + \text{imag}(s_{1i}), \end{cases} \quad \text{Equation 1}$$

$$i = 0, 1, \ldots, N_{sym}^{layer},$$

where $\text{real}(s_{2i})$ represents the in-phase component and $\text{imag}(s_{2i})$ represents the quadrature component.

Thus, in this embodiment, imaginary components for each QAM symbol of the first transmission layer may be interchanged with imaginary components from corresponding QAM symbols of the second transmission layer. Other embodiments may include the interchanging of in-phase components in a similar manner.

While Equation 1 contemplates an embodiment with two transmission layers, similar concepts may be extended to embodiments that include more than two transmission layers. Various embodiments, including those having more than two transmission layers, may include a variety of I/Q substitution patterns. For example, an embodiment having four transmission layers, may have a QAM symbol of the first transmission layer interchange an in-phase or quadrature component with a corresponding in-phase or quadrature component of a QAM symbol of the second transmission layer, while a QAM symbol of the third transmission layer may interchange an in-phase or quadrature component with a corresponding in-phase or quadrature component of a QAM symbol of the fourth transmission layer.

In another example of an I/Q substitution pattern for an embodiment having four transmission layers, in-phase or quadrature components may be shifted by one transmission layer. For example, an in-phase or quadrature component of a QAM symbol of the first transmission layer may be substituted for an in-phase or quadrature component of a QAM symbol of the second transmission layer, the in-phase or quadrature component of the QAM symbol of the second transmission layer may be substituted for an in-phase or quadrature component of the third transmission layer, the in-phase or quadrature component of the QAM symbol of the third transmission layer may be substituted for an in-phase or quadrature component of the fourth transmission layer, and the in-phase or quadrature component of the fourth transmission layer may be substituted for the in-phase or quadrature component of the first transmission layer.

In some embodiments, the layer shifter 208 may provide another level of layer shifting following the I/Q layer shift. For example, the I/Q-shifted QAM symbols may be shifted across the transmission layers according to a predefined pattern. In one embodiment, the predefined pattern may include the shift of symbols with an even index between the two transmission layers while keeping the symbols with an odd index unshifted. The twice-shifted transmission layers, $s_{1i}^{II}$ and $s_{2i}^{II}$ may be represented by the following equation.

$$\begin{cases} s_{1i}^{II} = [s_{1,2i+1}^I s_{2,2i}^I] \\ s_{2i}^{II} = [s_{2,2i+1}^I s_{1,2i}^I], \end{cases} \quad \text{Equation 2}$$

$$i = \begin{cases} 0, 1, \ldots, \dfrac{N_{sym}^{layer}}{2}; & \text{if\_N}_{sym}^{layer} \bmod 2 = 0 \\ 0, 1, \ldots, \dfrac{N_{sym}^{layer}-1}{2}; & \text{if\_N}_{sym}^{layer} \bmod 2 \neq 0 \end{cases}$$

While Equation 2 indicates that QAM level layer shifting is applied as the second-order shifting operation, i.e., the shifting operation after the I/Q layer shift, other embodiments may include other types of layer shifting as the second order layer shifting operation such as, but not limited to, single-carrier (SC) frequency division multiplexing (FDM)—level layer shifting. Furthermore, some embodiments may have the I/Q layer shift as the second-order (or greater) layer shifting operation.

The transmitter 200 may also include a signal constructor 210, coupled with the layer shifter, to receive the shifted symbols. The signal constructor 210 may construct first and second radio frequency signals, $RF_1$ and $RF_2$, that are to be transmitted over the link by first and second antennas 212_1 and 212_2, respectively. In construction of the radio frequency signals, the signal constructor 210 may employ a variety of signal construction techniques such as, but not limited to, precoding for desired beamforming, resource element mapping, and signal generation. In some embodiments, the signal generation may include SC frequency division multiple access (FDMA) signal generation with the signals transmitted over the antennas 212 over different frequency bands.

Figure 3:
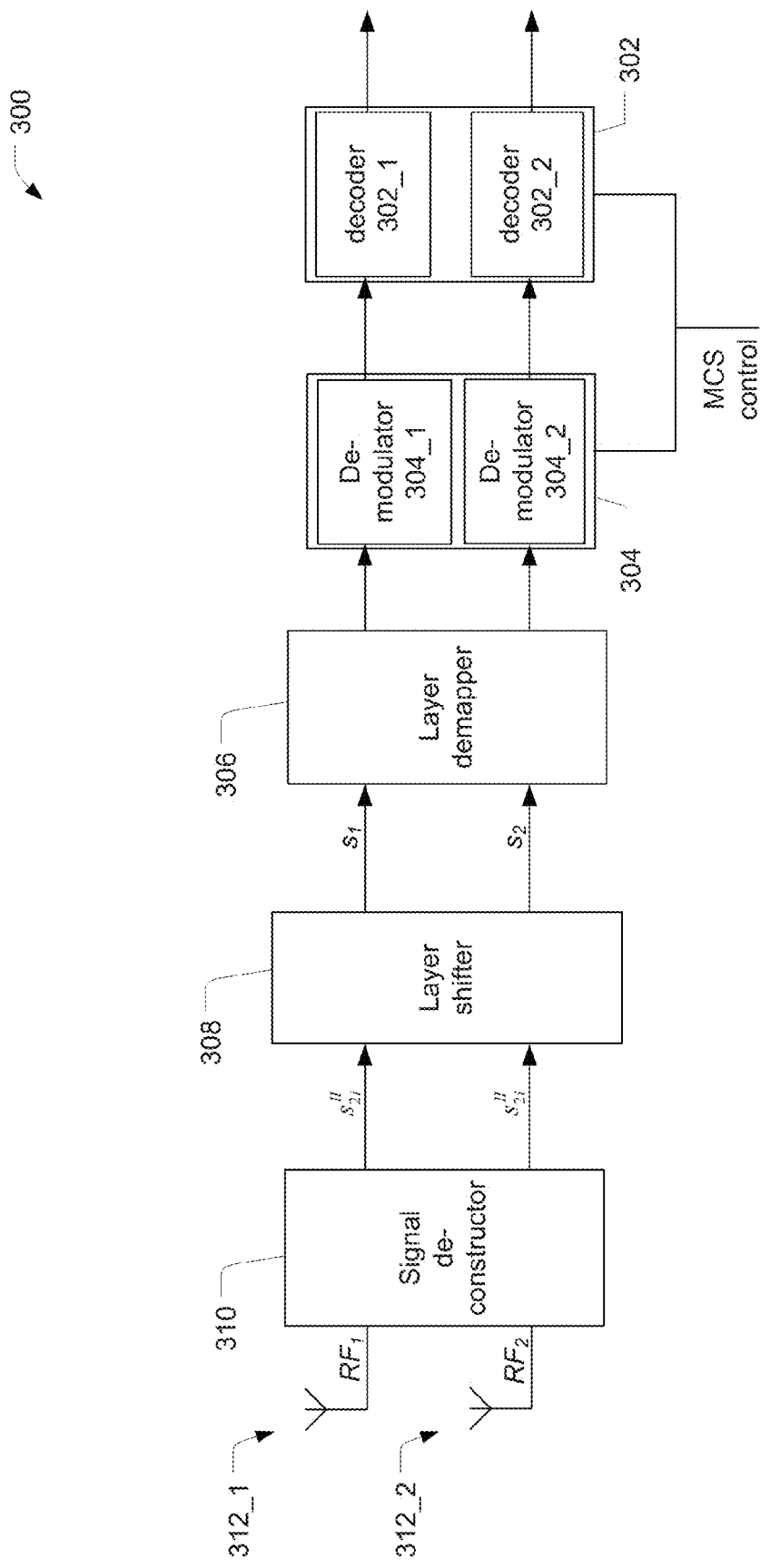
FIG. 3 illustrates a receiver in accordance with some embodiments.

FIG. 3 illustrates a receiver 300 in accordance with some embodiments. The receiver 300 may be part of the eNB 108 and configured to receive SM MIMO uplink communications in the open-loop operation mode. The SM MIMO uplink communications may have been I/Q layer shifted as described above. In general, the receiver 300 may include components that provide complementary operations to those described above with respect to transmitter 200.

The receiver 300 may include antennas 312_1 and 312_2 to receive respective RF signals, $RF_1$ and $RF_2$, over the link. A signal de-constructor 310 of the receiver 300 may deconstruct the RF signals in order to provide the twice-shifted transmission layers, $s_{1i}^{II}$ and $s_{2i}^{II}$.

A layer shifter 308 of the receiver 300 may perform shifting operations to complement the shifting operations performed by layer shifter 208. In particular, in accordance with an embodiment, the layer shifter 308 may provide functions to complement the first- and second-order layer shifting embodied by Equations 1 and 2. The layer shifter 308 may output QAM symbols of first and second transmission layers, $s_1$ and $s_2$.

The receiver 300 may further include a demodulator 304 and a decoder 302 that are configured to respectively demodulate and decode the received data to output unencoded bits. The demodulation and decoding may be performed with respect to the MCS control signal that reflects the same MCS used by the transmitter 200.

Figure 4:
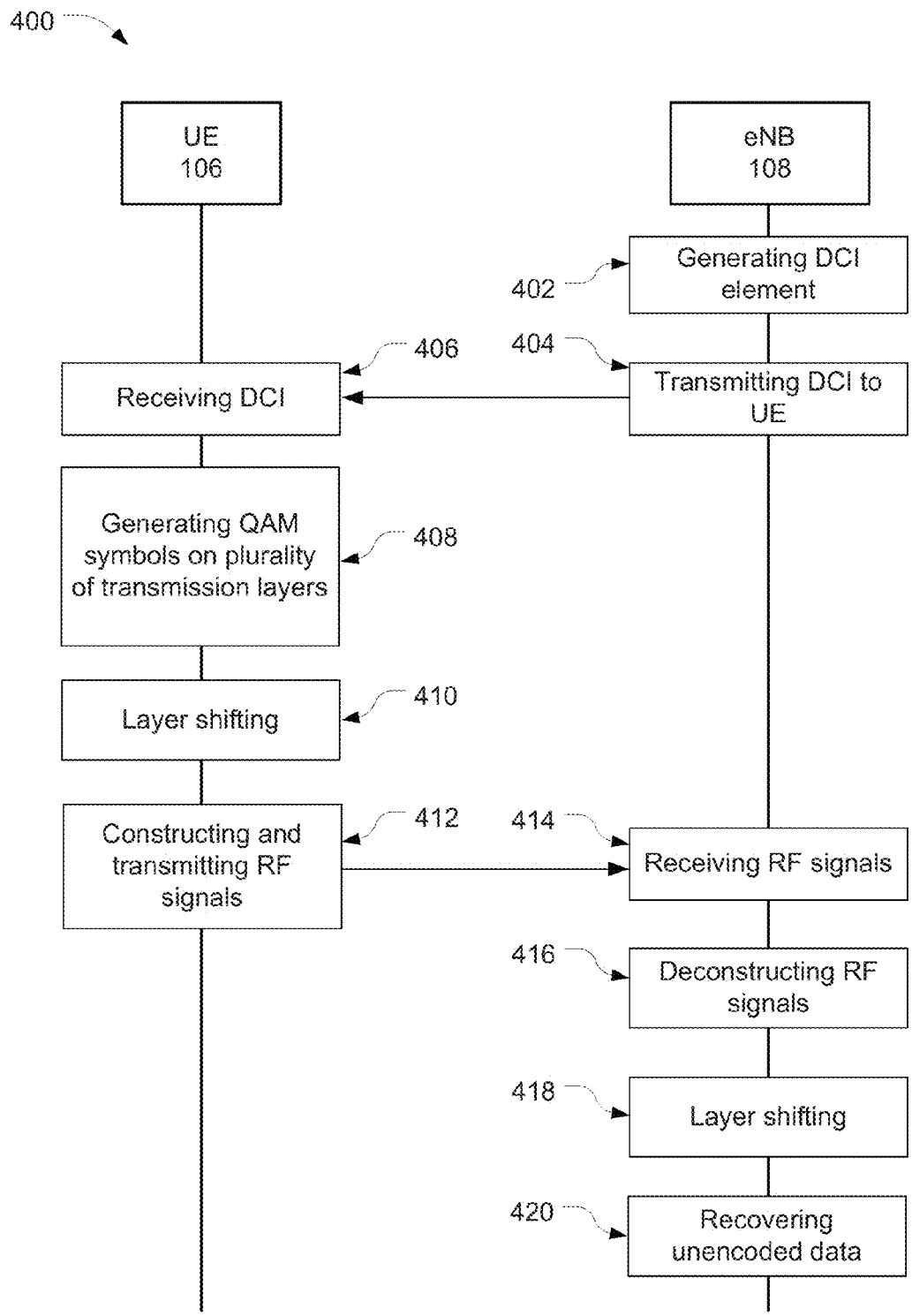
FIG. 4 illustrates the transmission sequence in accordance with some embodiments.

FIG. 4 illustrates a transmission sequence 400 in accordance with some embodiments. Specifically, the transmission sequence 400 illustrates an MIMO transmission in an open-loop operation mode using I/Q layer shifting in the uplink communication.

The transmission sequence 400 may begin with the eNB 108 generating downlink control information (DCI) at block 402. The DCI element may include an MCS for the UE 106 to use in uplink transmissions.

In a legacy DCI element, an MCS is provided for each transport block. A transport block may correspond, in size, to a media access control (MAC) protocol data unit (PDU). Further, given the assumption of closed loop uplink operation, PMI is also included in the legacy DCI element. The overhead of a DCI element of the present embodiment, when using layer shifting in an open loop uplink operation, may be reduced by excluding the PMI information and using a single MCS both transmit blocks. This may result in, e.g., 9 or 12 bits of payload reduction, depending on a number of antenna ports of the transmitter, compared to a legacy DCI element.

In some embodiments, the eNB 108 may generate a DCI element in accordance with the legacy format in which the MCS of the second transmit block and the PMI are disabled. In other embodiments, the eNB 108 may generate a DCI element in accordance with a format in which only one MCS is transmitted for both transmit blocks and no PMI is transmitted.

At block 404, the transmission sequence 400 may include transmitting, by a transmitter of the eNB 108, of the DCI to the UE 106. In some embodiments the DCI may be transmitted as downlink control signaling information on a physical downlink control channel (PDCCH).

At block 406, the transmission sequence 400 may include receiving, by a receiver of the UE 106, of the DCI from the eNB 108. The UE 106 may determine an MCS included in the DCI. In the event the DCI element has a legacy format, the UE 106 may simply disregard information that corresponds to the MCS of the second transmit block and/or the PMI.

At block 408, the transmission sequence 400 may include generating, by the UE 106, QAM symbols on a plurality of transmission layers. The generating of the QAM symbols may include encoding and modulating of the data based on the MCS, and mapping the QAM symbols to the plurality of transmission layers.

At block 410, the transmission sequence 400 may include layer shifting by the UE 106. The layer shifting may include shifting of I/Q components between the different transmission layers. The layer shifting may further include, in some embodiments, the shifting of full symbols between transmission layers.

At block 412, the transmission sequence 400 may further include constructing and transmitting, by the UE 106, RF signals. The RF signals may be transmitted in an uplink to the eNB 108, which may receive the RF signals at block 414.

At block 416, the transmission sequence 400 may include deconstructing, by the eNB 108, the received RF signals. The deconstructing of the RF signals may result in shifted transmission layers.

At block 418, the transmission sequence 400 may include layer shifting, by the eNB 108, the shifted transmission layers. The layer shifting may include shifting any shifted symbols back to original transmission layers, if second-order shifting was performed, and shifting the I/Q components back to original transmission layers.

At block 420, the transmission sequence 400 may include recovering, by the eNB 108, the unencoded data. The recovering of the unencoded data may include demodulating and decoding in accordance with the MCS transmitted in the DCI.

Figure 5:
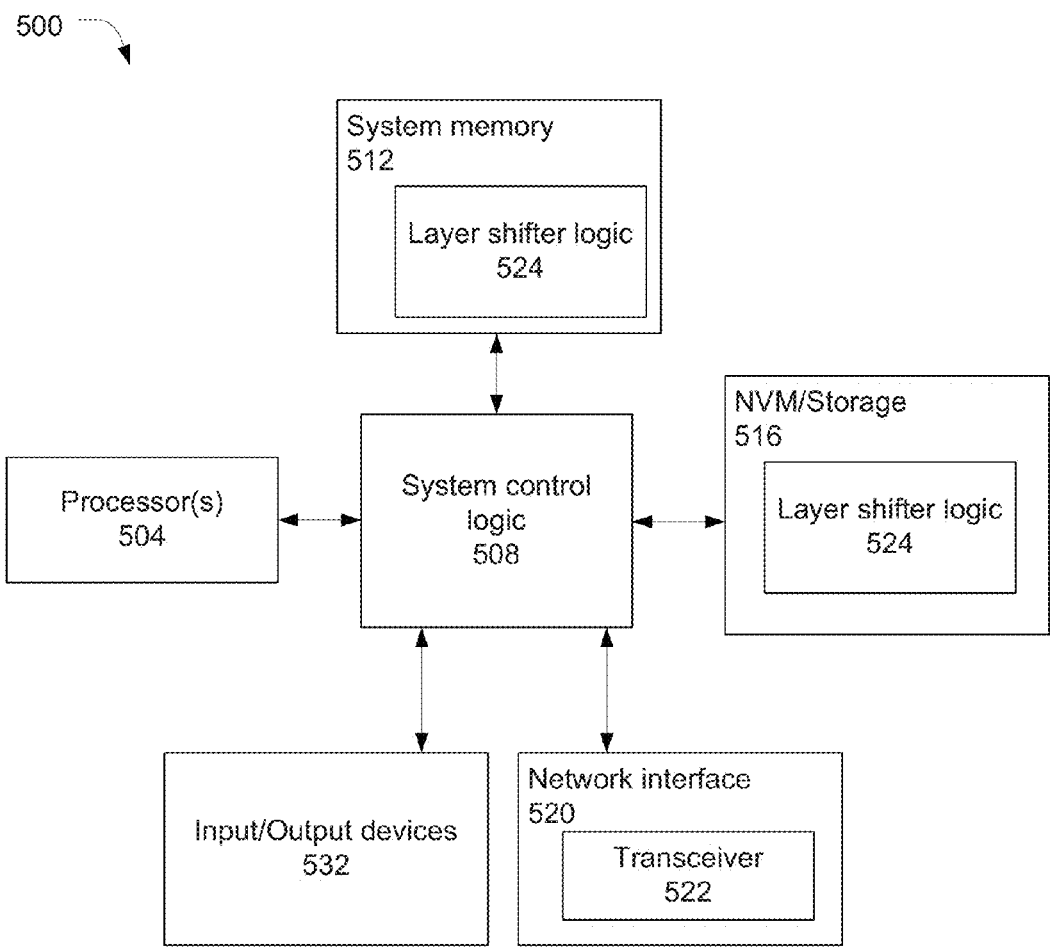
FIG. 5 illustrates a system that may be used to practice various embodiments described herein.

The layer shifters described herein may be implemented into a system using any suitable hardware and/or software to configure as desired. FIG. 5 illustrates, for one embodiment, an example system 500 comprising one or more processor(s) 504, system control logic 508 coupled to at least one of the processor(s) 504, system memory 512 coupled to system control logic 508, non-volatile memory (NVM)/storage 516 coupled to system control logic 508, and a network interface 520 coupled to system control logic 508. In various embodiments, the system 500 may be the UE 106 or the eNB 108.

The one or more processor(s) 504 may include one or more single-core or multi-core processors. The one or more processor(s) 504 may include any combination of general-purpose processors and dedicated processors (e.g., graphics processors, application processors, etc.).

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s) for example.

The NVM/storage 516 may include a storage resource physically part of a device on which the system 500 is installed or it may be accessible by, but not necessarily a part of, the device. For example, the NVM/storage 516 may be accessed over a network via the network interface 520.

System memory 512 and NVM/storage 516 may include, in particular, temporal and persistent copies of layer shifter logic 524, respectively. The layer shifter logic 524 may include instructions that when executed by at least one of the processor(s) 504 result in the system 500 performing layer shifting operations described herein. In some embodiments, the layer shifter logic 524, or hardware, firmware, and/or software components thereof, may additionally/alternatively be located in the system control logic 508, the network interface 520, and/or the processor(s) 504.

Network interface 520 may have a transceiver 522 to provide a radio interface for system 500 to communicate over one or more network(s) and/or with any other suitable device. The transceiver 522 may be similar to, and substantially interchangeable with, transmitter 200 and/or receiver 300. Network interface 520 may include any suitable hardware and/or firmware. Network interface 520 may include a plurality of antennas to provide a MIMO radio interface. Network interface 520 for one embodiment may include, for example, a network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

The system 500 may further include input/output (I/O) devices 532. The I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, a still camera, a video camera, a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. In various embodiments, system 500 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A transmitter comprising:
    a layer mapper configured to map a first set of quadrature amplitude modulated (QAM) symbols to a first transmission layer and a second set of QAM symbols to a second transmission layer, wherein individual QAM symbols of the first and second sets include a real component and an imaginary component; and
    a layer shifter configured to substitute a real component of a first QAM symbol of the first set of QAM symbols for a real component of a second QAM symbol of the second set of QAM symbols or substitute an imaginary component of the first QAM symbol of the first set of QAM symbols for an imaginary component of the second QAM symbol of the second set of QAM symbols.

2. The transmitter of claim 1, wherein the layer shifter is configured to interchange the real or imaginary component of the first QAM symbol with the corresponding real or imaginary component of the second QAM symbol.

3. The transmitter of claim 1, wherein the layer shifter is configured to interchange real or imaginary components of each QAM symbol of the first set of QAM symbols with respective real or imaginary components of each QAM symbol of the second set of QAM symbols.

4. The transmitter of claim 1, wherein the layer shifter is further configured to:
    shift one or more QAM symbols of the first set from the first transmission layer to the second transmission layer; and
    shift one or more QAM symbols of the second set from the second transmission layer to the first transmission layer.

5. The transmitter of claim 4,
    wherein the one or more QAM symbols of the first set consist of QAM symbols with odd-numbered indices; and
    wherein the one or more QAM symbols of the second set consist of QAM symbols with odd-numbered indices.

6. The transmitter of claim 1, wherein the transmitter is configured to construct a plurality of radio frequency signals to transmit the first and second set of QAM symbols by a spatially multiplexed (SM) multiple-input, multiple-output (MIMO) uplink communication.

7. The transmitter of claim 6, wherein the transmitter is configured to operate in an open loop mode to transmit the first and second set of QAM symbols by the SM MIMO uplink communication.

8. The transmitter of claim 6, further comprising:
one or more encoders configured to encode data for two transport blocks based on a single modulation coding scheme (MCS) value fed back from an entity to which the plurality of RF signals are directed.

9. The transmitter of claim 8, further comprising:
one or more modulators configured to modulate the encoded data for two transport blocks based on the single MCS value.

10. A method comprising:
receiving, by a user equipment from an enhanced node base station (eNB), a downlink control information (DCI) element that includes a modulation and coding scheme (MCS) value;
generating quadrature amplitude modulation (QAM) symbols on a plurality of transmission layers based on the MCS value;
shifting interphase or quadrature components of the QAM symbols across the plurality of transmission layers, wherein said shifting interphase or quadrature components includes substituting an interphase component from a first QAM symbol of a first transmission layer for an interphase component from a second QAM symbol of a second transmission layer or substituting a quadrature component from the first QAM symbol of the first transmission layer for a quadrature component from the second QAM symbol of the second transmission layer;
constructing a plurality of radio frequency signals based on the QAM symbols; and
transmitting the plurality of RF signals to the eNB over a wireless interface.

11. The method of claim 10, wherein said shifting interphase and the quadrature components further comprises:
interchanging the interphase or quadrature component from the first QAM symbol with the corresponding interphase or quadrature component from the second QAM symbol.

12. The method of claim 10, further comprising:
shifting one or more QAM symbols across the plurality of transmission layers.

13. The method of claim 12, wherein said shifting of one or more QAM symbols across the plurality of transmission layers occurs after said shifting interphase or quadrature components of the QAM symbols.

14. An enhanced node base station (eNB), comprising:
a transmitter configured to transmit a downlink control information (DCI) element to a user equipment (UE), the DCI element having a modulation and coding scheme (MCS) value; and
a receiver configured to:
receive, as a multiple-input, multiple-output (MIMO) communication, a plurality of radio frequency (RF) signals from the UE;
deconstruct the plurality of RF signals to recover a first stream of symbols on first transmission layer and a second stream of symbols on a second transmission layer; and
substitute an interphase component of a first symbol of the first stream for an interphase component of a second symbol of the second stream or substitute a quadrature component of the first symbol of the first stream for a quadrature component of the second symbol of the second stream.

15. The eNB of claim 14, wherein the receiver is further configured to interchange the interphase or quadrature component of the first symbol with the corresponding interphase or quadrature component of the second symbol.

16. The eNB of claim 14, wherein the MCS value is to be used for two transport blocks.

17. A system comprising:
a receiver configured to receive a modulation and coding scheme (MCS) value; and
a transmitter coupled with the receiver and configured to:
encode data according to the MCS value to provide encoded data;
modulate the encoded data to provide quadrature amplitude multiplexing (QAM) symbols;
map the QAM symbols to first and second transmission layers; and
substitute an interphase component of a QAM symbol of the first transmission layer for an interphase component of a QAM symbol of the second transmission layer or substitute a quadrature component of the first symbol of the first stream for a quadrature component of the second symbol of the second stream.

18. The system of claim 17, wherein the transmitter is configured to encode data for two transport blocks according to the MCS value.

19. The system of claim 17, further comprising:
a plurality of antennas to provide the system with a multiple-input, multiple-output communication interface.

20. The system of claim 19, wherein the system comprises a mobile computing device comprising:
a user interface including a display and a microphone.

* * * * *